United States Patent

Veranth

[19]

[11] Patent Number: 6,055,420
[45] Date of Patent: Apr. 25, 2000

[54] ANTENNA SYSTEM HAVING A HIGH Q CIRCUIT

[75] Inventor: Joseph L. Veranth, Southborough, Mass.

[73] Assignee: Bose Corproation, Framingham, Mass.

[21] Appl. No.: 08/051,321

[22] Filed: Feb. 18, 1993

Related U.S. Application Data

[63] Continuation of application No. 07/540,108, Jun. 19, 1990, abandoned.

[51] Int. Cl.[7] .................................................... H04B 1/18
[52] U.S. Cl. ...................................... 455/193.1; 455/290
[58] Field of Search .................................. 455/289, 290, 455/291, 169.1, 121, 71, 193, 214, 296; 343/745, 748, 860

[56] References Cited

U.S. PATENT DOCUMENTS

| | | | |
|---|---|---|---|
| 2,750,497 | 6/1956 | Stott | 455/289 |
| 3,571,715 | 3/1971 | Beary | 455/193 |
| 3,571,719 | 3/1971 | Beary | 455/193 |
| 3,600,684 | 8/1971 | Cherry | 455/193 |
| 3,613,008 | 10/1971 | Jabbar | 455/289 |
| 4,186,350 | 1/1980 | Takayama | 455/291 |
| 4,381,566 | 4/1983 | Kane | 455/193 |
| 4,518,965 | 5/1985 | Hidaka | 455/193 |
| 4,851,830 | 7/1989 | Andros et al. | 455/71 |
| 4,862,516 | 8/1989 | Macnak et al. | 455/193 |
| 4,893,316 | 1/1990 | Janc et al. | 455/296 |
| 5,001,355 | 3/1991 | Rosen et al. | 250/551 |
| 5,001,727 | 3/1991 | McDavid | 455/214 |
| 5,038,405 | 8/1991 | Karr | 455/193 |
| 5,136,719 | 8/1992 | Gaskill et al. | 455/169.1 |

OTHER PUBLICATIONS

Robert L. Shrader, Electronic Communication—Fifth Edition, 1985, pp. 126–127.

*Primary Examiner*—Edward F. Urban
*Attorney, Agent, or Firm*—Fish & Richardson

[57] ABSTRACT

A tunable antenna system for operation over a predetermined frequency range includes a high Q antenna having a length and width each significantly less than a quarter wavelength within the predetermined frequency range. A controllable reactive element is coupled to the antenna and has a variable reactance for tuning the antenna in a high Q resonant circuit to the frequency of a desired signal in the frequency range coupled to the antenna. An antenna tuning circuit responsive to the frequency to which the antenna is tuned provides an antenna tuning signal to the controllable reactive element so that the antenna remains tuned to the frequency of the desired signal.

22 Claims, 2 Drawing Sheets

ANTENNA SYSTEM HAVING A HIGH Q CIRCUIT

This is a continuation of application Ser. No. 07/540,108, filed Jun. 19, 1990, now abandoned.

This invention relates to improving antennas.

Antennas typically have dimensions comparable to a multiple of one-quarter of the wavelength of the radiated energy. It is often impractical to realize these dimensions with structures of these mechanical dimensions, where, for example, the wavelength is relatively long, as in the AM radio band. A typical prior art technique is to approach these dimensions by adding electrical length with inductive loading of an antenna of relatively long mechanical length.

According to the invention there is at least one antenna element characterized by high Q and mechanical dimensions that are a small fraction of a wavelength. The antenna element may be a rod, loop or slot, for example. A controllable reactive element tunes the antenna element to the desired frequency.

Smaller higher-Q antennas are desirable for receivers because they improve selectivity of the receiver and reduce susceptibility of the receiver to RF intermodulation distortion. Small antenna size also facilitates locating the antenna for good transduction and use of multiple elements for improved properties.

According to one aspect of the invention, a detector provides a level signal representative of the intensity of a signal of desired frequency. A dither generator provides a dither signal for perturbing the reactance of the controllable reactive element. A multiplier multiplies the level signal with the dither signal. A low-pass filter filters the multiplier output. The dither signal is typically a sine wave having a frequency outside of the audio range, and the controllable reactive element is typically a varactor. The antenna and the varactor form a resonant circuit having a Q greater than 100.

In another embodiment the detector produces a phase signal representative of the phase of the desired signal from the antenna. In another embodiment the dither signal perturbs a controllable tuner that tunes the local frequency of the local oscillator. In another embodiment a transmitter injects a tickler signal into the antenna, the level detector or the phase detector detects the tickler signal, and the dither signal perturbs the tickler signal frequency.

In another embodiment a transmitter transmits a tickler signal, a second receiver receives the tickler signal, and the antenna is located between the transmitter and the second receiver so that transmission path between the transmitter and the second receiver has a transfer characteristic that is affected by tuning of the antenna. An antenna-tuning circuit produces the antenna-tuning signal, which the antenna-tuning circuit servo-controls in response to the tickler signal received by the second receiver circuit. In another embodiment an impedance detector provides an output signal representative of the impedance of the antenna, and an antenna-tuning circuit produces the antenna-tuning signal, which the antenna-tuning circuit servo-controls in response to the output of the impedance detector.

BRIEF DESCRIPTION OF THE DRAWINGS

Numerous other features and advantages will become apparent from the following detailed description when read in connection with the accompanying drawings in which.

DESCRIPTION OF THE PREFERRED EMBODIMENTS

Figure 1:
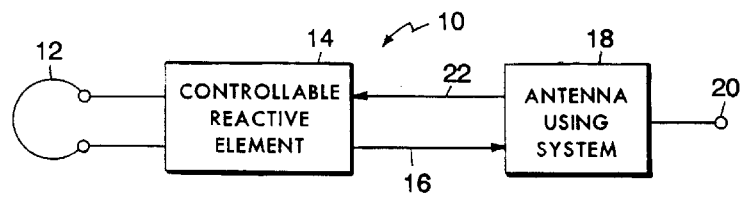
FIG. 1 is a block diagram of a system according to the invention.

With reference now to the drawings, and more particularly FIG. 1, there is shown a block diagram of a radio system 10 embodying the invention. Antenna 12 may be a loop, as shown, a rod and ground plane (monopole), a dipole, a slot, or any other small antenna configuration. Antenna 12 is connected to a controllable reactive element 14, such as a varactor, which resonates with the reactive part, typically inductance, of the antenna impedance. Antenna 12 is coupled to antenna using system 18, having a terminal 20 and providing an antenna-tuning signal on line 22 that controls reactive element 14 to resonate with the reactance of antenna 12 at the frequency of the desired signal transduced by antenna 12. Antenna using system 18 adjusts the antenna-tuning signal on line 22 to tune antenna 12 to the frequency of the desired signal. A feature of the invention is that the high Q tuned antenna circuit provides high selectivity with a physically small antenna structure.

Figure 2:
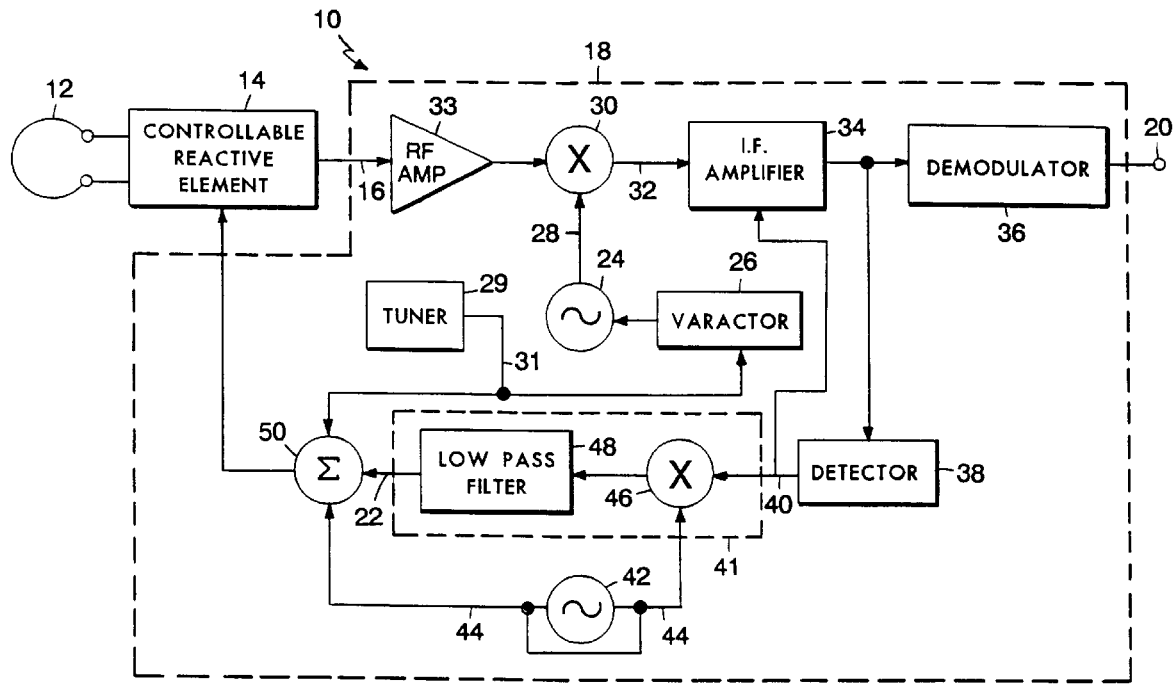
FIG. 2 is a block diagram of an embodiment of the invention in a receiving system.

Referring to FIG. 2, there is shown a block diagram of one embodiment of the invention, in which antenna using system 18 is a superheterodyne receiver having a local oscillator 24 tuned by a varactor 26 and producing a local oscillator signal on line 28. Tuner 29 produces a tuning voltage on line 31 that is applied to both varactor 26 associated with local oscillator 24 and varactor 14 associated with antenna 12 so that the antenna tuning tracks the receiver tuning. A mixer 30 combines the output of RF amplifier 33 with the local oscillator signal on line 28 to produce an intermediate frequency signal on line 32, which is amplified by intermediate-frequency amplifier 34 and demodulated by demodulator 36 to produce an audio output signal on terminal 20.

Level detector 38, which may be an automatic gain control circuit, produces a level signal on line 40 representative of the intensity of the desired signal. The level signal is fed back to intermediate-frequency amplifier 34 to provide automatic gain control. Level signal 40 also energizes antenna-tuning circuit 41, having multiplier 46 and low-pass filter 48, to produce a component of the antenna-tuning signal. Generator 42 produces a dither signal on line 44, which is used to perturb the reactance of varactor 14. The dither signal is preferably a sine wave, of subaudible frequency such as 16 $H_z$. Multiplier 46 combines the dither signal with the level signal on line 40 to provide a product signal that passes through low-pass filter 48 to produce a component of the antenna-tuning signal. Summer 50 combines this component with the dither signal on line 44 and the tuning voltage on line 31 to provide the antenna tuning signal applied to reactive element 14, typically a varactor, to keep antenna 12 tuned to the frequency of the desired signal. When the actual resonant frequency of the antenna 12 deviates from the desired frequency, the level on line 40 representative of the output of the antenna at the desired frequency fluctuates with the dither signal on line 44 to produce an antenna tuning signal component on line 22 that reduces the difference between the actual resonant frequency of antenna 12 and the frequency of the desired signal.

In another embodiment, detector 38 and antenna tuning circuit 41 may be replaced by a phase detector such as a phase-locked loop, phase discriminator or ratio detector, that produces a phase signal representative of the phase of the signal from antenna 12.

In another embodiment, the dither signal may dither the frequency of the local oscillator 24 instead of the reactance of reactive element 14 associated with antenna 12.

Figure 3:
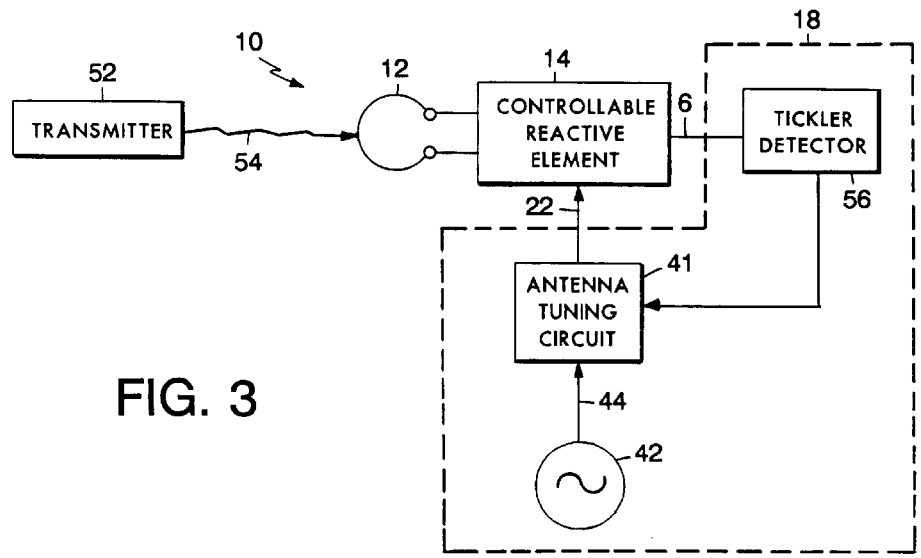
FIGS. 3–5 are block diagrams of other embodiments of the invention in a receiving system.

Referring to FIG. 3, there is shown yet another embodiment of the invention, in which a transmitter 52 transmits a tickler signal over path 54 to antenna 12. Antenna using circuit 18 includes a tickler detector 56 that detects the intensity or phase of the tickler signal, a dither generator 42, and an antenna-tuning circuit 41. The dither signal may perturb the reactance of reactive element 14 associated with antenna 12 or it may perturb the tickler frequency.

Figure 4:
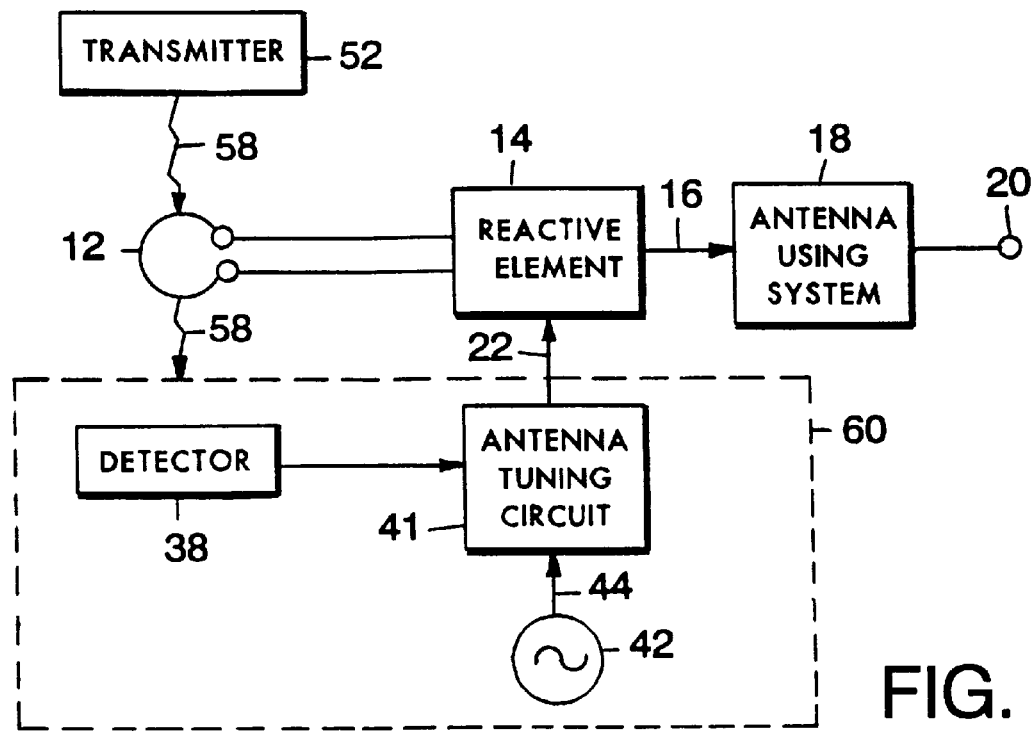

Referring to FIG. 4, there is shown yet another embodiment of the invention, in which a transmitter 52 transmits a tickler signal over path 58 to a receiver 60. Antenna 12 is located between transmitter 52 and receiver 60, so that impedance variations of the antenna 12 perturb the tickler signal. The path 58 between transmitter 52 and receiver 60 has a transfer characteristic that is affected by the tuning of antenna 12. The antenna-tuning circuit 41 may be located within either the antenna using circuit 18 that is coupled to antenna 12, or receiver 60 that receives the tickler signal over path 58. Detector 38 detects the intensity or the phase of the tickler signal received by receiver 60, and the dither signal 44 may perturb the reactance of reactive element 14 associated with antenna 12 or the tickler frequency.

Note that with reference to FIGS. 3 and 4, the tickler signal may consist of two discrete frequencies, rather than one dithered frequency, and the servo may function by detecting the relative amplitude or phase of the two signals. Neither signal has to be in the signal band.

Figure 5:
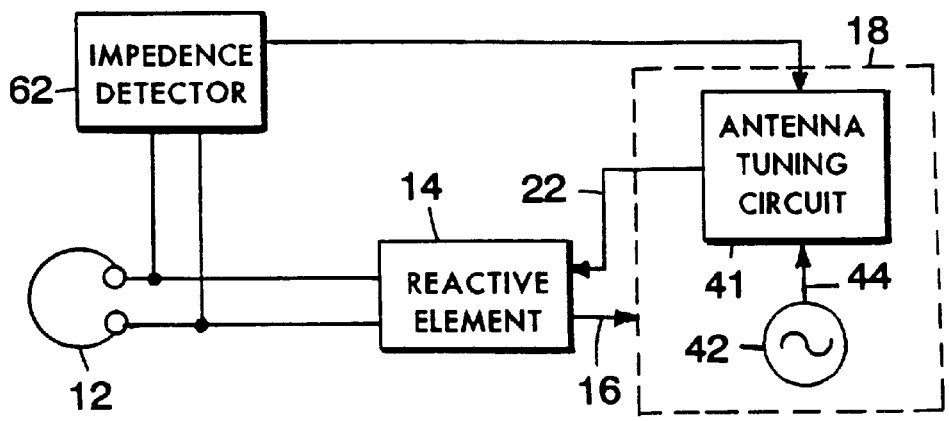

Referring to FIG. 5, there is shown yet another embodiment of the invention, in which an impedance detector 62 detects the impedance of antenna 12. Since the impedance of the antenna is a function of its tuning, antenna-tuning circuit 41 may receive as its input the output of impedance detector 62. The dither signal 44 may perturb the reactance of reactive element 14 associated with antenna 12 or the signal provided by impedance detector 62.

Other embodiments are within the following claims.

What is claimed is:

1. A tunable antenna system for operation over a predetermined frequency range comprising,
   a high Q antenna having a length and width each significantly and much less than a quarter wavelength within said predetermined frequency range,
   a controllable reactive element coupled to said antenna having a variable reactance for tuning said antenna in a high Q resonant circuit to the frequency of a desired signal in said frequency range, and
   an antenna-tuning circuit having a detector for providing a level signal representative of a signal transduced by said antenna and said antenna-tuning circuit being responsive to said level signal for continuously providing an antenna-tuning signal to said controllable reactive element, to control the reactance of the reactive element so that the antenna remains tuned to the frequency of said desired signal.

2. The tunable antenna system of claim 1 wherein the controllable reactive element is a varactor.

3. The tunable antenna system of claim 1 further comprising an antenna using system coupled to said antenna having a tuner for tuning the antenna using system over a frequency range substantially greater than the bandwidth of a desired signal transduced by the antenna.

4. The tunable antenna system of claim 3 wherein the antenna and the reactive element comprise a circuit having a Q greater than 100.

5. The tunable antenna system of claim 1 and further comprising
   an impedance detector for providing an impedance signal characteristic of the impedance of the antenna,
   said antenna-tuning circuit being responsive to said impedance signal.

6. A tunable antenna system for operation over a predetermined frequency range comprising,
   a high Q antenna having a length and width each significantly less than a quarter wavelength within said predetermined frequency range,
   a controllable reactive element coupled to said antenna having a variable reactance for tuning said antenna in a high Q resonant circuit to the frequency of a desired signal in said frequency range, and
   an antenna-tuning circuit having a detector for providing a level signal representative of a signal transduced by said antenna and said antenna-tuning circuit being responsive to said level signal for providing an antenna-tuning signal to said controllable reactive element, to control the reactance of reactive element so that the antenna remains tuned to the frequency of said desired signal,
   wherein the antenna tuning circuit comprises,
   a generator for producing a dither signal of subaudible frequency,
   and a correction circuit for producing the antenna-tuning signal in response to the level signal and the dither signal.

7. The tunable antenna system of claim 6 wherein the correction circuit comprises a multiplier for multiplying the level signal with the dither signal to produce a product signal,
   and a low-pass filter for filtering the product signal to produce at least a component of the antenna-tuning signal.

8. The tunable antenna system of claim 6 wherein said detector is a phase detector for producing said level signal representative of phase of a signal transduced by said antenna.

9. The tunable antenna system of claim 6 and further comprising means responsive to the dither signal for perturbing the reactance of the reactive element at the frequency of said dither signal.

10. The tunable antenna system of claim 6 and further comprising,
    a superheterodyne receiver circuit having a local oscillator of controllable frequency,
    and means responsive to said dither signal for varying the frequency of said local oscillator at a rate corresponding to said subaudible frequency.

11. The tunable antenna system of claim 6 and further comprising a transmitter for injecting a tickler signal of tickler frequency within said predetermined frequency range into the antenna.

12. The tunable antenna system of claim 11 and further comprising,
    means responsive to said dither signal for varying the tickler frequency of the tickler signal at a rate corresponding to said subaudible frequency.

13. A tunable antenna system for operation over a predetermined frequency range comprising,
    a high Q antenna having a length and width each significantly less than a quarter wavelength within said predetermined frequency range, a controllable reactive element coupled to said antenna having a variable reactance for tuning said antenna in a high Q resonant circuit to the frequency of a desired signal in said frequency range, and an antenna-tuning circuit having a detector for providing a level signal representative of a signal transduced by said antenna and said antenna-tuning circuit being responsive to said level signal for providing an antenna-tuning signal to said controllable reactive element, to control the reactance of the reactive element so that the antenna remains tuned to the frequency of said desired signal, a transmitter for transmitting a tickler signal a receiver circuit for receiving the tickler signal, said antenna-tuning circuit detector being responsive to the tickler signal received by the receiver circuit, the antenna being located between the transmitter and the receiver circuit so that the transmission path between the transmitter and the receiver circuit has a transfer characteristic that is affected by tuning of the antenna.

14. The tunable antenna system of claim 12 wherein the antenna-tuning circuit is located in the receiver circuit.

15. A method of transducing radio signals over a predetermined frequency range comprising the steps of, intercoupling an antenna using system with a high Q antenna having a length and width each significantly and much less than a quarter wavelength within said predetermined frequency range, continuously tuning said antenna with a controllable reactive element having a controllable variable reactance in a high Q resonant circuit to the frequency of a desired signal within said predetermined frequency range, and controlling the reactance of the reactive element with an antenna-tuning circuit that is responsive to the frequency to which said antenna is tuned and that provides an antenna-tuning signal to said controllable reactive element, to maintain the antenna tuned to the frequency of said desired signal.

16. The method of claim 15 and further comprising the step of tuning the antenna using system over a frequency range substantially greater than the bandwidth of a: desired signal to be transduced by the antenna.

17. The method of claim 15 and further comprising, sensing the impedance of the antenna to provide said antenna-tuning signal, and controlling the reactance of the reactive element with the antenna-tuning signal.

18. A method of transducing radio signals over a predetermined frequency range comprising the steps of, intercoupling an antenna using system with a high Q antenna having a length and width each significantly less than a quarter wavelength within said predetermined frequency range, tuning said antenna with a controllable reactive element having a controllable variable reactance to the frequency of a desired signal within said predetermined frequency range, and controlling the reactance of the reactive element with an antenna-tuning circuit that is responsive to the frequency to which said antenna is tuned and that provides an antenna-tuning signal to said controllable reactive element, to maintain the antenna tuned to the frequency of said desired signal, wherein the step of controlling the reactance comprises, producing a level signal representative of the frequency to which the antenna is then tuned, generating a dither signal of subaudible frequency for varying the frequency of said tuning signal at a rate corresponding to said subaudible frequency, combining the level signal with the dither signal to provide an antenna tuning signal, and applying the antenna-tuning signal to the controllable reactive element.

19. The method of claim 18 wherein the step of producing a level signal includes producing a signal representative of phase of a signal transduced by the antenna.

20. A method of transducing radio signals over a predetermined frequency range comprising the steps of, intercoupling an antenna using system with a high Q antenna having a length and width each significantly less than a quarter wavelength within said predetermined frequency range, tuning said antenna with a controllable reactive element having a controllable variable reactance to the frequency of a desired signal within said predetermined frequency range, and controlling the reactance of the reactive element with an antenna-tuning circuit that is responsive to the frequency to which said antenna is tuned and that provides an antenna-tuning signal to said controllable reactive element, to maintain the antenna tuned to the frequency of said desired signal, transmitting a tickler signal of frequency within said frequency range from a transmitter through the antenna to a receiver so that the transfer characteristic between the transmitter and receiver is related to the frequency to which the antenna is tuned to produce with the receiver an antenna tuning signal, and controlling the reactance of the reactive element with the antenna-tuning signal.

21. A tunable antenna system for operation over a predetermined frequency range comprising, a high Q antenna having a length and width each significantly less than a quarter wavelength within said predetermined frequency range, a controllable reactive element coupled to said antenna having a variable reactance for tuning said antenna in a high Q resonant circuit to the frequency of a desired signal in said frequency range, and an antenna-tuning circuit having a detector for providing a level signal representative of a signal transduced by said antenna and said antenna-tuning circuit being responsive to said level signal for providing an antenna-tuning signal to said controllable reactive element, to control the reactance of the reactive element so that the antenna remains tuned to the frequency of said desired signal, wherein the antenna tuning circuit comprises, a generator for producing a dither signal of frequency outside the audible frequency range, and a correction circuit for producing the antenna-tuning signal in response to the level signal and the dither signal.

22. A method of transducing radio signals over a predetermined frequency range comprising the steps of, intercoupling an antenna using system with a high Q antenna having a length and width each significantly less than a quarter wavelength within said predetermined frequency range, tuning said antenna with a controllable reactive element having a controllable variable reactance to the frequency of a desired signal within said predetermined frequency range, and controlling the reactance of the reactive element with an antenna-tuning circuit that is responsive to the frequency to which said antenna is tuned and that provides an antenna-tuning signal to said controllable reactive element, to maintain the antenna tuned to the frequency of said desired signal, wherein the step of controlling the reactance comprises, producing a level signal representative of the frequency to which the antenna is then tuned, generating a dither signal of dither frequency outside the audible frequency range for varying the frequency of said tuning signal at a rate corresponding to said dither frequency, combining the level signal with the dither signal to provide an antenna tuning signal, and applying the antenna-tuning signal to the controllable reactive element.

* * * * *